May 19, 1936.   J. A. CHAMBERLIN ET AL   2,041,229
LABORATORY IMPLEMENT
Filed Oct. 15, 1934
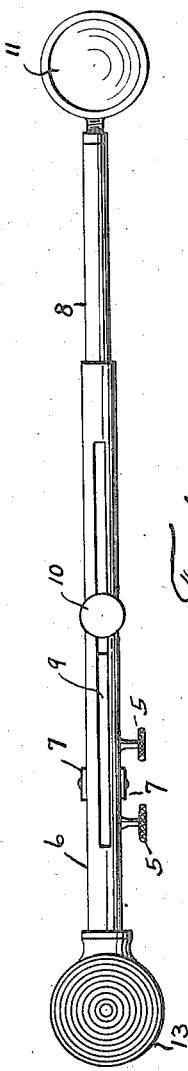
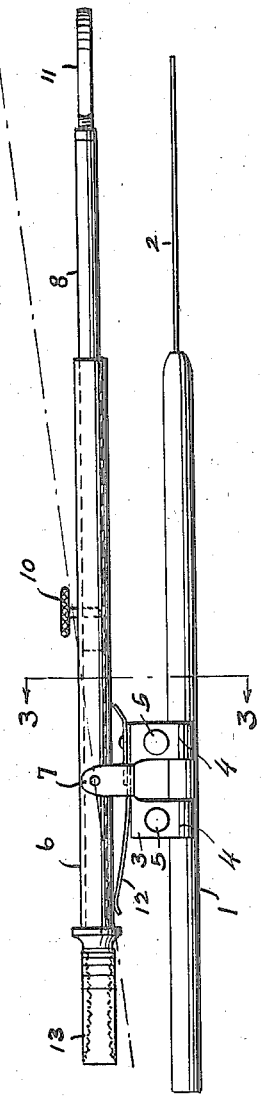
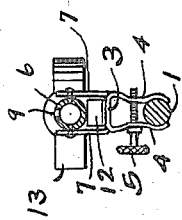
Inventors
James A. Chamberlin
Adolphus W. Owens
By Hardway Mathey
Attorneys Patented May 19, 1936

2,041,229

UNITED STATES PATENT OFFICE 2,041,229

LABORATORY IMPLEMENT

James A. Chamberlin and Adolphus W. Owens, Houston, Tex.

Application October 15, 1934, Serial No. 748,362

2 Claims. (Cl. 88—39)

This invention relates to a laboratory implement.

An object of the invention is to provide a hand implement for handling bacteria in the process of bacteria culture.

Another object of the invention is to provide an implement whereby the bacteria may be readily inspected.

The implement is capable of general use for laboratory purposes for handling and examining bacteria as well as germs or other small objects.

With the above and other objects in view, the invention has particular relation to certain novel features of construction, operation, and arrangement of parts, an example of which is given in the specification and illustrated in the accompanying drawing, wherein:—

Figure 1 shows a front elevation.

Figure 2 shows a side elevation, and

Figure 3 shows a cross-sectional view taken on the line 3—3 of Figure 2.

In the drawing the numeral 1 designates a handle or holder projecting from one end of which is a needle 2, preferably formed of a platinum wire.

There is a bracket 3 having the clamps 4, 4, which embrace the holder 1. Clamp screws 5, 5, are threaded through said clamps whereby the clamps may be caused to grip, or release, the holder.

The numeral 6 designates a tubular stock which is located between the overturned lugs 7, 7, formed integrally with the bracket 3, and said stock is pivotally connected to said lugs.

Slidably fitted into one end of the stock 6 there is the supporting rod 8. The stock 6 has the longitudinal slot 9, and a set screw 10 is fitted through said slot and screwed into the rod 8 whereby said rod may be adjusted longitudinally relative to the stock. The free end of the rod 8 supports the microscope 11, which is located opposite the free end of the needle 2.

It sometimes becomes necessary, or desirable, to heat the needle 2 to sterilize the same, and when this is to be done the microscope 11 may be moved back toward the stock 6 so that it will not be affected by the heat. When the sterilizing process is finished the microscope 11 may be adjusted back to its original, or active, position. Suitable adjustments may be made to bring the subject under inspection in proper relation to the microscope either by adjusting the microscope relative to the stock 6 or by adjusting the holder 1 in the clamps 4.

Secured to the bracket 3 between the lugs 7 there is a flat spring 12 whose free ends rest against the stock 6 and normally hold it in parallel relation to the holder 1.

The other end of the stock 6 carries a grip member 13. In the hands of the user, the grip 13 may be depressed so as to adjust the microscope to the required distance from the bacteria on the end of the needle 2 which is being inspected or handled.

The implement may be used for transferring bacteria on to the agar or other culture medium on the conventional culture plate; or when it is desired to remove the bacteria from the culture colony, the implement may be used and a specimen of bacteria may be recovered on the needle 2 from the culture colony. In carrying on this work, by the use of the microscope an uncontaminated specimen of the bacteria may be recovered for examination or other desired purposes.

The drawing and description disclose what is now considered to be a preferred form of the invention by way of illustration only, while the broad principle of the invention will be defined by the appended claims.

What we claim is:

1. An implement of the character described comprising a holder and a stock approximately of equal length and arranged parallel, a bracket having an adjustable clamp, one of said stock and holder being pivoted to the bracket and the other being adjustable lengthwise in the clamp, a yieldable member on the bracket normally acting to hold the holder and stock in said parallel relation and being yieldable to permit them to be moved into angular relation, a microscope on one end of the stock, said holder including a needle for supporting a subject in position to be inspected through the microscope, said microscope and needle being adjustable, one relative to the other.

2. An implement of the character described comprising a holder and a stock of substantially the same length, and arranged parallel, a bracket having clamps spaced apart at one side and overturned spaced lugs at the other side, one of said stock and holder being pivoted between the lugs, and the other being secured between the clamps, means for varying the gripping effect of the clamps on the member held thereby, a yieldable member on the bracket normally acting to hold the holder and stock in said parallel relation and being yieldable to permit them to be moved into angular relation, a microscope on one end of the stock, said holder including a needle for supporting a subject in position to be inspected through the microscope, said stock being formed of telescoping parts whereby its length may be varied.

JAMES A. CHAMBERLIN.
ADOLPHUS W. OWENS.